United States Patent

[11] 3,584,507

| | | | |
|---|---|---|---|
| [72] | Inventor | Rudolph Hohenberg | |
| | | Trumbull, Conn. | |
| [21] | Appl. No. | 17,270 | |
| [22] | Filed | Mar. 6, 1970 | |
| [45] | Patented | June 15, 1971 | |
| [73] | Assignee | Avco Corporation | |
| | | Stratford, Conn. | |

[54] ENGINE USAGE INDICATOR
17 Claims, 2 Drawing Figs.

[52] U.S. Cl. .................................................. 73/116,
235/183
[51] Int. Cl. ............................................ G01m 15/00
[50] Field of Search .......................................... 73/117.2,
117.3, 116, 346; 235/183; 324/68

[56] References Cited
UNITED STATES PATENTS

| | | | | |
|---|---|---|---|---|
| 3,358,281 | 12/1967 | Masel | | 235/183 UX |
| 3,527,086 | 9/1970 | Evans et al. | | 73/116 |

*Primary Examiner*—Jerry W. Myracle
*Attorneys*—Charles M. Hogan and Irwin P. Garfinkle ABSTRACT: Intervals between overhaul are determined by continuously measuring power turbine temperature and shaft speed and by converting the collected data into numbers of pulses proportional to creep, low cycle fatigue, and temperature shock fatigue. The number of pulses is then summed in digital counters. The total number of pulses due to creep, low cycle fatigue, and temperature shock fatigue are used as a measure of the exhausted life of the engine.

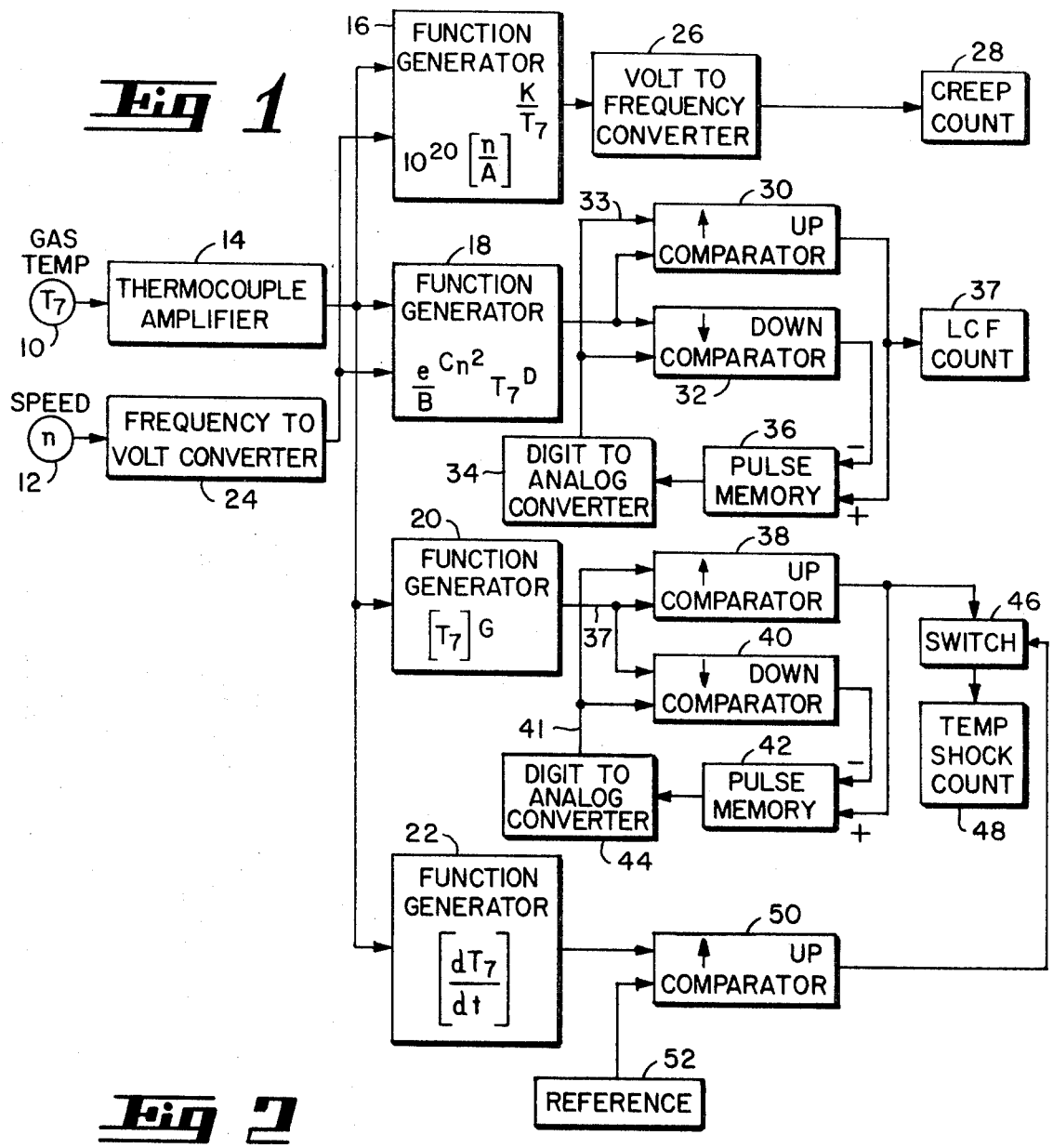

ENGINE USAGE INDICATOR

BACKGROUND OF THE INVENTION

It has been the practice to determine the interval between engine maintenance procedures by simply computing the total exhausted engine life as a function of time of operation of the engine. Such a system is highly inaccurate because the manner in which the engine is used is highly critical and requires large tolerances so that any abusive manner in which the engine may have been used could safely be taken into account.

In may U.S. Pat. No. 3,357,239 entitled "Gas Turbine Engine Life Indicator" and assigned to the same assignee as this invention, I disclosed a system which indicated engine life as a time integration of a function of engine gas temperatures plus the rate of change of engine gas temperatures. The present invention is an improvement over that system.

There are numerous factors that determine exhausted engine life. Among these are power levels of operation, the number and severity of accelerations, the number of starts, and climatic conditions. This invention takes into account the most important of these factors and provides a rational determination of the intervals between maintenance and retirement.

Turbine engines are exposed to effects which can cause abrupt and catastrophic failure, yet progression toward failure caused by certain of these phenomena cannot be judged through deterioration of performance. Generally these effects may be grouped as creep, low cycle fatigue, and temperature shock.

Application of load to structural members at elevated temperatures results in a slow deformation; i.e., creep. In the case of turbine blades, creep produces a decrease of tip clearance, and therefore results in a minor improvement in performance until interference with a nonrotating sealing surface occurs, at which time there is an abrupt failure.

Low cycle fatigue is caused by the cyclic application and removal of load which eventually causes cracks in structural members, but with little or no plastic deformation. As cracks progress towards catastrophic failure, there may be no discernible change in performance until total failure of the part.

Temperature shock fatigue results from stresses which are generated as a function of rapid temperature changes. Such stresses can also result in sudden catastrophic failures.

Analytical and empirical testing of engine parts resulted in several equations by which creep and fatigue effects can be predicted. The time-temperature relationship for rupture and creep stresses was written for a gas turbine engine in terms of power turbine inlet temperature and rotor speed of the power turbine stages. A straight line approximation of the failure relationship results in the following expression:

$$t_r = 10^{-20} \left[\frac{n}{A}\right]^{-\frac{K}{T_7}} \quad \text{(Equation 1)}$$

where
$t_r$ = creep life
$n$ = shaft speed
$T_7$ = power turbine temperature, and
$A$ and $K$ are constants derived for the particular engine.

If $t_r$ is the creep life of a new part at specified shaft speed and gas temperatures, then the reciprocal of $t_r$, $1/t_r$, is a measure of the deteriorating effect due to creep.

Integrating $1/t_r$ with respect to time permits totalizing the creep input to the engine. Thus, $$U_c = \int_0^t 10^{20} \left[\frac{n}{A}\right]^{\frac{K}{T_7}} \quad \text{(Equation 2)}$$

where
$U_C$ = creep
$t$ = time

Thus, creep is a time integration function of speed and of power turbine temperature. In engine usage, the rate at which $U_c$ is cumulated increases dramatically as speed and gas temperature become larger.

The factors which govern low cycle fatigue were empirically simplified as follows:

$$N_f = Be^{-Cn^2}(T_7)^{-D} \quad \text{(Equation 3)}$$ where $N_f$ = number of cycles to failure
$e$ = natural $e$
$n$ = shaft speed
$T_7$ = power turbine inlet total temperature, and
$B, C, D$ = constants derived for the particular engine.

Since $N_f$ is a measure of the number of cycles of failure for operating cycles between zero and the specified speed and gas temperature, then the reciprocal of $N_f$, $1/N_f$, is an estimate of the deteriorating effect of one cycle. The summation of each $1/N_f$ contribution for each cycle (i.e., engine acceleration) results in the low cycle fatigue input to the engine as follows:

to $T = T_{max}$
$n = n_{max}$ $$U_f = \Sigma \Delta \left[\frac{e^{Cn^2}}{B} T_7^D\right] \quad \text{(Equation 4)}$$

from $T = T_{min}$
to $n = n_{min}$ where:
$U_f$ = low cycle fatigue input

Low cycle fatigue is independent of time. The summation of $U_f$ does not increase as an engine runs at steady state, at any power level. As an engine is used, $U_f$ increases with the number of engine accelerations weighted by speed and temperature changes.

Temperature shock-fatigue factors also influence the life of gas turbines and are considered. It is known that thermal stresses are generated as a function of temperature changes which may cause significant deterioration of some stationary hot components. Theoretical considerations indicate that the number of temperature shock cycles to failure is related to temperature change modified by the rate of temperature change. The following equation was constructed to described temperature shock-fatigue:

to $\frac{dT}{dt} < F$ $$U_s \Sigma [\Delta T_7{}^G] \quad \text{(Equation 5)}$$

from $\frac{dT}{dt} > F$ where:
$U_s$ = temperature shock fatigue
$T_7$ = power turbine inlet temperature
$F, G$ = analytically derived constant, and
$t$ = time $U_s$ is dependent only on the change of gas temperature in any period when the temperature rate of change exceeds the threshold level $F$. $U_s$ increases with engine starts and with rapid accelerations.

The invention provides apparatus for measuring and storing the exhausted life of an engine in accordance with the factors $U_c$, $V_f$, and $U_s$.

DESCRIPTION OF THE DRAWINGS

FIG. 1 is a block diagram of one embodiment of this invention; and

FIG. 2 is a block diagram showing a modification of the invention utilizing a simplified system for determining fatigue due to temperature shock.

DESCRIPTION OF THE ILLUSTRATED EMBODIMENT

The illustrated embodiment requires two sensors, one a thermocouple 10 for measuring the gas temperatures $T_7$ of the power turbine of a turbine engine (not shown), and the other, a speed sensor 12 for measuring the speed of rotation $n$ of the engine shaft. The output of the thermocouple 10, a direct voltage proportional to power turbine gas temperature $T_7$, is amplified in an amplifier 14 and then applied to four function generators 16, 18, 20, and 22. The output from the speed sensor 12, a pulsating voltage having a frequency directly proportional to shaft speed, is first converted to an analog voltage in a frequency to voltage converter 24 and then applied to two of the function generators 16 and 18.

For determining creep, the $T_7$ gas temperature output from thermocouple amplifier 14 and the $n$ shaft speed output from the frequency to voltage converter 24 are applied to the function generator 16. For any $T_7$ and $n$ inputs, the output of the function generator 16 is an analog voltage equal to $$10^{20}\left[\frac{n}{A}\right]^{KT_7}$$

The analog output of the function generator 16 is the converted in the voltage to frequency converter 26 to pulses having a frequency directly proportional to magnitude. The creep count is established by integrating, or summing, the number of pulses from the output of the converter 26. This is done in counter 28.

For determining low cycle fatigue, the gas temperature output $T_7$ from the amplifier 14 and the shaft speed output $n$ from the converter 24 are applied to the function generator 18. For any $T_7$ and $n$ inputs, the output of the function generator is equal to the reciprocal of $N_f$, or $1/N_f$.

Since Equation 4 required the totalization of the magnitude of the changes in the up direction of $1/N_f$, the output of the function generator is applied through signal line 29 to an up comparator 30 and a down comparator 32. In addition, each of the comparators is supplied through a reference line 33 with a reference voltage derived from a digital-to-analog converter 34, which in turn is supplied from a digital pulse memory 36. The output pulses developed from the up comparator 30 are summed in a low cycle frequency counter 37.

The comparators 30 and 32 are bistable circuits, each having an output voltage of zero or one, depending on the relationship between the reference voltage at line 33 and the signal voltage at line 29. The up comparator differs from the down comparator in that it responds only to positive differences whereas the down comparator responds only to negative differences between the signal and reference voltages. Thus, when the signal voltage on line 29 is greater than the reference voltage on line 33, the output of the up comparator 30 is one. The output of comparator 30 is zero when the signal voltage is equal to or less than the reference voltage. On the other hand, the output of the down comparator 32 is one when the signal voltage is less than the reference voltage. It is zero when the signal voltage is equal to or less than the reference voltage.

The digital-to-analog converter 34 is initially at a preestablished reference level, for example, one volt, when the pulse memory is zero. This preestablished reference level is equal to that incremental unit increase in signal voltage level necessary to produce one count in the counter 37. The output of the function generator may vary from zero to, for example, 15 volts. When the signal output of the function generator rises above the reference level, the up comparator 30 changes state, thereby generating a single positive pulse which is counted in the low cycle frequency counter 37.

When the signal output at line 29 falls below the reference voltage at line 33, the down comparator 32 changes state. However, the output from the down comparator 32 is not applied to the counter 37.

The output from the up comparator 30 and the output from the down comparator 32 are both applied to the pulse memory 36 where the pulses are subtractively stored. The digital level of the pulse memory 36 is converted in the digital-to-analog converter 34 to provide the reference voltage on line 33. Thus, as the signal increases one incremental unit to a level just above the reference level, the reference is increased by one incremental unit. Therefore, the difference between the reference voltage at line 33 and the signal voltage at line 29 is maintained within the incremental unit range. In the given example, the incremental unit is one volt.

With the digital-to-analog converter 34 at its initial level, an increase in the signal level at line 29 above that level produces a change of state in the up comparator 30. This change is counted in the counter 37. In addition, it adds one pulse to the pulse memory 36. This then results in an incremental unit change in the reference output voltage of the digital-to-analog converter 34. Thus the reference voltage on line 23 is again higher than the signal level by an amount approximately equal to the initial level. At this new reference voltage level (in the example, 2 volts), the reference voltage is greater than the signal so the up comparator resets to its zero state. Further incremental unit increases are similarly counted, the pulse memory 36 serving to keep track of the increases so that the digital-to-analog converter always provides a reference voltage which, immediately following reset, is approximately equal to the initial reference voltage.

As the signal voltage decreases below the reference level, the down comparator 32 changes state. However, the pulses developed by the down comparator are not applied to the counter 37, but only to the pulse memory where it serves to subtract one pulse. The subtraction of one pulse from the pulse memory 36 serves to reduce the reference output of the digital-to-analog converter 34, thereby resetting the down comparator 32 to its zero state.

For temperature shock, the summing of temperature changes is done exactly the same as for low cycle fatigue. However, Equation 5 requires that the sum be collected only when the rate of change of temperature exceeds a predetermined threshold. For this purpose, the gas temperature output $T_7$ from the amplifier 14 is applied to both the function generator 20 and to the function generator 22.

For any $T_7$ input, the output of function generator 20 is a voltage proportional to $T_7^6$. This voltage is applied via line 37 to both an up comparator 38 and a down comparator 40. The comparators 38 and 40 are identical to the comparators 30 and 32 and are also supplied with a reference voltage developed at line 41. The reference voltage at line 41 is established by means of a pulse memory 42, which derives its input from the pulse outputs of the up and down comparators 38 and 40. The digital memory of the pulse memory 42 is supplied to a digital to analog converter 44 which provides the reference voltage at line 41. When the pulse memory 42 is at zero, the digital-to-analog converter 44 develops an initial reference voltage. As with converter 34, the initial level preestablishes that incremental unit change necessary to develop an output pulse from the up comparator 38.

The output from the up comparator 38 is applied through an electronic switch 46 to a temperature shock counter 48. Equation 5 requires that temperature shock be counted only when the rate of change of temperature exceeds a predetermined level, and therefore the system is arranged so that the switch 46 is closed, i.e., permits the flow of current only when the rate of change of temperature in an increasing direction exceeds a predetermined threshold.

For any $T_7$ input, the function generator 22 develops an output signal voltage proportional to the rate of change of temperature, $dT_7/dt$. The output signal voltage of the function generator 22 is applied to an up comparator 50, to which is also supplied a fixed reference voltage from a DC reference voltage source 52. When the magnitude of the output of the function generator 22 exceeds the reference level of the source 52, the up comparator 50 changes state, and remains in such changed state until the signal falls below the reference. The output of the up comparator 50 in its changed state serves to maintain the switch 46 closed for so long as the rate of change of temperature $dT_7/dt$ exceeds the reference level When the switch 46 is closed, the pulse output from the up comparator 38 is counted in the temperature shock counter 48.

DESCRIPTION OF THE EMBODIMENT OF FIG. 2

FIG. 2 represents a modification of the system for measuring fatigue due to temperature shock. While the solution for Equation 5 is approximated with some precision by the system shown in FIG. 1, experience has indicated that the simplified arrangement shown in FIG. 2 yields a useful approximation.

FIG. 2 approximates the functions of FIG. 1 by eliminating the switch 36 and the associated threshold circuitry and by using the output of the function generator 22 for developing signals to the up and down comparators 38 and 40.

Referring to FIG. 2, the $T_7$ output from the thermocouple amplifier 14 is applied to the function generator 22. For any $T_7$ input, the output of the function generator 22 is a direct voltage having a magnitude directly proportional to $dT_7/dt$, the rate of change of temperature. The output from the function generator is then simultaneously applied through line 37 to the up comparator 38 and the down comparator 40. As in the FIG. 1 arrangement, the comparators 38 and 40 are also supplied with a reference voltage from the digital to analog converter 44, the voltage level of which is established by the digital pulse memory 42. The output from the up comparator 38 is applied directly to the temperature shock counter 48.

In operation, the temperature shock counter will count one pulse on each occasion that the rate of change of temperature increases one incremental unit, as established by the initial value of the converter 44.

SUMMARY OF THE INVENTION

By means of this invention I monitor two engine operating parameters and I generate from those parameters three functions proportional to creep, low cycle fatigue, and temperature shock fatigue. Using a set of constants which are different for each engine, and using empirical and theoretical considerations, I weight the various functions and assign to them values proportional to their magnitude. I convert these value to a count which is stored. The summation of the counts generated by each of the functions is the measure which is used as a determinant of the interval between various overhaul and maintenance operations.

In applying the invention to any particular engine, the various weighting constants can be determined by running life tests on engines while storing the number of counts generated by each of the functions, so that meaningful summations can then be made. Experience with the engine usage indicator permits an extension of the interval between maintenance and overhaul by adjusting the constants.

In reducing the invention to practice, a particular engine, the Avco Lycoming T55-L engine served the basis for study. The four stages of turbine blades were selected as representative of those factors affected by creep. The analysis of the blades was performed adapting the method published by Larson and Miller in a paper entitled "A Time-Temperature Relationship for Rupture and Creep Stresses," published by The American Society of Mechanical Engineers, Paper No. 51-A-36, 1951. It was found that the time-temperature relationship for rupture and creep stresses could be written in terms of power turbine inlet temperature $T_7$ and rotor speed $n$ for all four turbine stages. A comparison of the relationship of the four turbine stages showed that engine life could be represented by a single curve over a useful range. The life range with acceptable accuracy extends from the short term, due to pure static tensile failure, to the long term, in excess of 100,000 hours. Equation 1 was a straight-line approximation of the failure relationship.

The turbine discs of the Avco Lycoming T55-L11 engine were selected as being representative of susceptibility to failure by a low cycle fatigue mechanism. A failure relationship was derived using empirical test data which was augmented by static-tensile and creep rupture information using the method developed by Manson and Halford and disclosed in a paper entitled "A Method of Estimating High Temperature Low Cycle Fatigue Behavior of Materials," published in NASA Technical Memorandum TM X-52270, 1967. The assumption was made that the disc is cycled between the fixed limit of zero speed at room temperature and a single peak temperature and speed. Equation 3 represents a simplified expression for the number of cycles to failure.

The temperature shock-fatigue mechanism was also analyzed. It was known that thermal stresses are generated as a function of temperature changes. Present analytical work indicates that this factor is significant in the deterioration of certain stationary hot components. Theoretical considerations indicated that the number of temperature shock cycles to failure is related to temperature change modified by the rate of temperature change. The analysis used to develop Equation 5 was an extension of earlier work described by Albrecht in "Thermo-impulsspannungen in einer ebenen Platte," ("Thermal STresses in a Flat Plate"), published in "Konstruktion," Vol. 19, Issue 9, 1967. The extension of the thermal stress calculations to include turbine geometry was performed by Albrecht. Equation 5 was constructed to describe temperature shock exposure within the boundaries applicable to the T55-L11 engine.

I claim:

1. In a system for determining the exhausted life of a gas turbine engine, said system including means for generating a first signal proportional to engine temperature and a second signal proportional to shaft speed of said engine, the combination comprising:

a first function generator, said first and second signals being applied to said first function generator, said first function generator having an output signal approximately proportional to the exhausted life of said engine due to creep, said exhausted life due to creep being a first function of engine temperature and speed;

a frequency converter for converting said output signal to first pulses having a repetition rate proportional to the magnitude of said output signal;

first digital means for summing the number of said pulses, the summation of said pulses representing the exhausted life of said engine due to creep;

a second function generator, said first and second signals being applied to said second function generator, said second function generator having an output signal approximately proportional to the exhausted life of said engine due to low cycle fatigue, said exhausted life due to low cycle fatigue being a second function of engine temperature and speed;

second digital summing means for summing the approximate magnitude of the output of said second function generator when the output of said second function generator is increasing, said summation representing the exhausted life of said engine due to low cycle fatigue;

additional function generator means, said first signal being applied to said additional function generator means, said additional function generator means having an output signal approximately proportional to the exhausted life of said engine due to temperature shock, said exhausted life due to shock being a function of the rate of change of temperature; and third digital summing means for summing the magnitude of the output of said additional function generator means when the output signal from said function generator is increasing, said summation approximately representing the exhausted life of said engine due to temperature shock.

2. The invention as defined in claim 1 wherein the output signal from said first function generator is proportional to $$10^{2n}\left[\frac{n}{A}\right]^{\frac{k}{T}} \text{ and}$$

wherein the output signal from said second function generator is proportional to $\frac{e^{Cn^2}}{B} T_7{}^D$, where $n$ is said shaft speed,
$T_7$ is temperature,
$A, B, C, D$ and $K$ are constants which are empirically determined, and
$e$ is natural $e$.

3. The invention as defined in claim 1 wherein said additional function generator means is a third function generator having an output signal approximately proportional to the rate of change of said temperature with respect to time.

4. The invention as defined in claim 3 wherein said third digital summing means comprises:
   first and second comparators, each of said comparators being supplied with the output signal of said third function generator and with a reference signal, said comparators each being a two-state device, said first comparator being in its first state when said output signal is less than said reference signal and being in its second state when said output signal is greater than said reference signal, said second comparator being in its first state when said output signal is less than said reference signal and being in its second state when said output signal is greater than said reference signal;
   means for counting the total number of changes of said first comparator from said first state to said second state, the total of said count representing an approximation of said exhausted life due to low cycle fatigue; and
   a reference signal generator for generating said reference signal, said generator having an initial output signal level, said reference signal generator including means for increasing and decreasing said reference signal level one unit for each change of said first and second comparators, respectively, from a first state to a second state, said unit being equal to said initial level.

5. The invention as defined in claim 4 wherein said reference signal generator comprises a digital pulse memory, said pulse memory being supplied with the output of each comparator, the digital output of said memory being equal to the difference between the numbers of pulses generated by said first and second comparators; and a digital-to-analog converter supplied with the digital output of said memory, the analog output of said converter being said reference signal.

6. The invention as defined in claim 1 wherein said additional function generator comprises a third function generator and a fourth function generator, said third function generator having an output which is approximately proportional to the rate of change of temperature with respect to time, said fourth function generator having an output which is approximately proportional to said temperature; and wherein said third digital means for summing the output of said additional function generator means includes an electronic switch, the increasing output of said fourth function generator being applied to said third digital means through said electronic switch, said switch passing the output of said fourth function generator to said third digital summing means only when the output of said third function generator in an increasing direction exceeds a predetermined level.

7. The invention as defined in claim 6 wherein said third digital summing means comprises:
   first and second comparators, each of said comparators being supplied with the output signal of said fourth function generator and with a reference signal, said comparators each being a two-state device, said first comparator being in its first state when said output signal is less than said reference signal and being in its second state when said output signal is greater than said reference signal, said second comparator being in its first state when said output signal is less than said reference signal and being in its second state when said output signal is greater than said reference signal;
   a variable reference signal generator for generating said reference signal, said generator having an initial output signal level, said reference signal generator including means for increasing and decreasing said reference signal level one unit for each change of said first and second comparators, respectively, from a first state to a second state, said unit being equal to said initial level;
   said means when said output of said third function generator exceeds said predetermined level for counting the total number of changes of said first comparator from said first state to said second state, the total of said count representing an approximation of said exhausted life due to low cycle fatigue including said electronic switch; and
   an additional up comparator, said up comparator being supplied with the output of said third function generator and a fixed reference signal, the output of said up comparator being in one state when the output of said third function generator is less than said fixed reference and being in a second state when said output is greater than said fixed reference output, said output being applied to said electronic switch, said electronic switch being open when said output is in said one state, and closed when said output is in said second state.

8. The invention as defined in claim 7 wherein said variable reference generator comprises a digital pulse memory, said digital pulse memory being supplied with the output of each comparator, the digital output of said memory being equal to the difference between the numbers of pulses generated by said first and second comparators; and a digital to analog converter supplied with the digital output of said memory, the analog output of said converter being said reference signal.

9. The invention as defined in claim 1 wherein said second digital summing means comprises:
   first and second comparators, each of said comparators being supplied with the output signal of said second function generator and with a reference signal, said comparators each being a two-state device, said first comparator being in its first state when said output signal is less than said reference signal and being in its second state when said output signal is greater than said reference signal, said second comparator being in its first state when said output signal is less than said reference signal and being in its second state when said output signal is greater than said reference signal;
   means for counting the total number of changes of said first comparator from said first state to said second state, the total of said count representing an approximation of said exhausted life due to the low cycle fatigue; and
   a reference signal generator for generating said reference signal, said generator having an initial output signal level, said reference signal generator including means for increasing and decreasing said reference signal level one unit for each change of said first and second comparators, respectively, from a first state to a second state, said unit being equal to said initial level.

10. The invention as defined in claim 9 wherein said reference signal generator comprises a digital pulse memory, said pulse memory being supplied with the output of each comparator, the digital output of said memory being equal to the difference between the numbers of pulses generated by said first and second comparators; and a digital to analog converter supplied with the digital output of said memory, the analog output of said converter being said reference signal.

11. In a system for determining the exhausted life of a gas turbine engine, said system including means for generating a first signal proportional to engine temperature and a second signal proportional to shaft speed of said engine, the combination comprising:
   a function generator, said first and second signals being applied to said function generator, said function generator having an output signal approximately proportional to the exhausted life of said engine due to low cycle fatigue, said exhausted life being a function of said engine temperature and engine speed;

first and second comparators, each of said comparators being supplied with the output signal of said function generator and with a reference signal, said comparators each being a two-state device, said first comparator being in its first state when said output signal is less than said reference signal and being in its second state when said output signal is greater than said reference signal, said second comparator being in its first state when said output signal is less than said reference signal and being in its second state when said output signal is greater than said reference signal;

a reference signal generator for generating said reference signal, said generator having an initial output signal level, said reference signal generator including means for increasing and decreasing said reference signal level one unit for each change of said first and second comparators, respectively, from a first state to a second state, said unit being equal to said initial level; and digital means for summing the total number of changes of said first comparator from said first state to said second state, the summation of said changes representing an approximation of said exhausted life.

12. The invention as defined in claim 11 wherein the output signal from said function generator is proportional to $(e/B)^{Cn} T_7^D$, where $n$ is said shaft speed, $T_7$ is temperature, $B, C$ and $D$ are constants which are empirically determined, and $e$ is natural $e$.

13. The invention as defined in claim 11 wherein said reference signal generator comprises a digital pulse memory, said pulse memory being supplied with the output of each comparator, the digital output of said memory being equal to the difference between the numbers of pulses generated by said first and second comparators; and a digital to analog converter supplied with the digital output of said memory, the analog output of said converter being said reference signal.

14. In a system for determining the exhausted life of a gas turbine engine, said system including means for generating a signal proportional to at least one engine operating parameter, the combination comprising:

a function generator, said signal being applied to said function generator, said function generator having an output approximately proportional to the exhausted life of said engine due to fatigue, said exhausted life being a given function of said engine operating parameter;

first and second comparators, each of said comparators being supplied with the output signal of said function generator and with a reference signal, said comparators each being a two-state device, said first comparator being in its first state when said output signal is less than said reference signal and being in its second state when said output signal is greater than said reference signal, said second comparator being in its first state when said output signal is less than said reference signal and being in its second state when said output signal is greater than said reference signal;

a reference signal generator for generating said reference signal, said generator having an initial output level, said reference signal generator including means for increasing and decreasing said reference signal level one unit for each change of said first and second comparators, respectively, from a first state to a second state, said unit being equal to said initial level; and digital means for summing the total number of changes of said first comparator from said first state to said second state, the summation of said changes representing an approximation of said exhausted live.

15. The invention as defined in claim 14 wherein said engine operating parameter is temperature.

16. The invention as defined in claim 14 wherein said one engine operating parameter is temperature and wherein a second engine operating parameter is engine shaft speed.

17. The invention as defined in claim 14 wherein said reference signal generator comprises a digital pulse memory, said pulse memory being supplied with the output of each comparator, the digital output of said memory being equal to the difference between the numbers of pulses generated by said first and second comparators; and a digital-to-analog converter supplied with the digital output of said memory, the analog output of said converter being said reference signal.

PO-1050
(5/69)

UNITED STATES PATENT OFFICE
CERTIFICATE OF CORRECTION

Patent No. 3,584,507  Dated June 15, 1971

Inventor(s) Rudolph Hohenberg

It is certified that error appears in the above-identified patent and that said Letters Patent are hereby corrected as shown below:

Column 1, line 12, "may" should read --- my ---.

Column 2, (Equation 3) should read --- $N_f = Be^{-Cn^2}(T_7)^{-D}$ ---.

Column 2, line 13, "of" (second occurrence) should read --- to ---.

Column 2, Equation 5, should read --- $U_s = \Sigma \left[ \Delta T_7^G \right]$ ---.

Column 3, line 24, "the" (third occurrence) should read --- then ---.

Column 5, line 44, "value" should read --- values ---.

Column 5, line 57, "T55-L" should read --- T55-L11 ---.

Column 7, line 1, should read --- $10^{20} \left[ \frac{n}{A} \right]^{\frac{K}{T_7}}$, and ---.

Column 9, line 27, "(e/B)$^{Cn}$" should read --- $\frac{e}{B}^{Cn^2}$ ---.

Column 10, line 30, "live" should read --- life ---.

Signed and sealed this 21st day of December 1971.

(SEAL)
Attest:

EDWARD M. FLETCHER, JR.  ROBERT GOTTSCHALK
Attesting Officer  Acting Commissioner of Patents